United States Patent [19]

Mori

[11] 4,382,178
[45] May 3, 1983

[54] ELECTRONIC TRIP METER FOR AN AUTOMOTIVE VEHICLE

[75] Inventor: Kazuyuki Mori, Yokohama, Japan

[73] Assignee: Nissan Motor Company, Limited, Kanagawa, Japan

[21] Appl. No.: 128,189

[22] Filed: Mar. 7, 1980

[30] Foreign Application Priority Data

Mar. 9, 1979 [JP] Japan .................. 54-30179

[51] Int. Cl.³ .................................... G06M 3/02
[52] U.S. Cl. .................... 377/17; 364/444;
  377/24; 377/39; 377/52
[58] Field of Search ........ 235/92 DN, 92 CA, 92 PE,
  235/92 T, 92 EA; 364/444, 561; 340/22, 23

[56] References Cited

U.S. PATENT DOCUMENTS

| | | | |
|---|---|---|---|
| 3,845,289 | 10/1974 | French | 364/444 |
| 4,229,724 | 10/1980 | Marcus | 235/92 DN |
| 4,242,731 | 12/1980 | Mizote et al. | 364/444 |
| 4,244,514 | 1/1981 | Nomura et al. | 235/92 DN |
| 4,250,402 | 2/1981 | Mizote et al. | 235/92 DN |
| 4,263,657 | 4/1981 | Oka et al. | 235/92 PE |

FOREIGN PATENT DOCUMENTS

| | | |
|---|---|---|
| 2185824 | 1/1974 | France . |
| 2412819 | 7/1979 | France . |
| 1209652 | 10/1970 | United Kingdom . |
| 1396614 | 6/1975 | United Kingdom . |
| 2011685 | 7/1979 | United Kingdom . |
| 2011686 | 7/1979 | United Kingdom . |
| 2011687 | 7/1979 | United Kingdom . |

Primary Examiner—Joseph M. Thesz
Attorney, Agent, or Firm—Lowe, King, Price & Becker

[57] ABSTRACT

An electronic trip meter for an automotive vehicle comprises a memory circuit to store sector distances between a start point and intermediate and final destinations, a distance presetting circuit to determine alarm points near to and before intermediate and final destinations, a counter to count the actual distance travelled from the last destination, a comparator to output a signal from the time when the value in the counter becomes equal to that in the distance presetting circuit until the time when the value in the counter becomes equal to that in the memory circuit, an alarm device driven by the comparator output signal, and a display device. Such an electronic trip meter displays the remaining distance to the next destination while the comparator is sending out an output signal; that is, at any intermediate points in between an alarm-point and the next destination. At other times the display shows a value representative of the total distance travelled. Additionally, the alarm sound is kept ringing in between the alarm-point and the next destination.

15 Claims, 4 Drawing Figures

ELECTRONIC TRIP METER FOR AN AUTOMOTIVE VEHICLE

BACKGROUND OF THE INVENTION

The present invention relates to an electronic trip meter for an automotive vehicle, and more particularly relates to an alarm system for the electronic trip meter for providing an alarm so that the driver can perceive both impending and actual arrival at intermediate and final destinations.

As a trip meter for an automotive vehicle, conventionally, a mechanical device has been used which transmits a number representative of the number of revolutions of the vehicle road wheels to a counter provided with a digital display device. This type of trip meter can display actual distance travelled from the reset point (or start point) to the present point, if zeroed at the start point.

However, in order to know the remaining distance from the present point to the next destination, it is necessary to previously determine the total distance from the start point to the destination and subtract the distance displayed on a trip meter from the predetermined total distance. In addition, there is a need to know the remaining distances to both the intermediate and final destinations, in the case of a long trip.

For the above purpose, a trip meter has been proposed to which the operator can previously present information relating to a plurality of intermediate destinations and the final destination, and which sounds an alarm for a certain period of time whenever the vehicle comes near to or arrives at the intermediate destinations or the final destination, displaying the remaining distance to the final destination.

The trip meter described above, however, sounds an alarm for a fixed period of time at points shortly before the intermediate and final destinations and also at the intermediate and final destinations. It is sometimes difficult to distinguish these alarms, because the time intervals between them vary according to the vehicle speed, with the result that the driver is confused when hearing the alarm.

SUMMARY OF THE INVENTION

With the above problem in mind, accordingly, it is an object of the present invention to provide an electronic trip meter for an automotive vehicle whereby alarm sound is produced from the point in time when the vehicle comes near to an intermediate or final destination to the point in time when the vehicle arrives at said intermediate or final destination, while displaying the remaining distance to the next destination.

It is another object of the present invention to provide an electronic trip meter whereby both the remaining distance to an intermediate destination and a value representative of the accumulated total distance travelled from a start point to the present point can be displayed.

It is a further object of the present invention to provide an electronic trip meter whereby another alarm sound different from that at points near to intermediate and final destinations is provided at intermediate and final destinations.

It is a still further object of the present invention to provide an electronic trip meter wherein remaining distance is displayable from any given point to the next intermediate destination.

It is a still further object of the present invention to provide an electronic trip meter whereby matters to be attended to are displayable by marks or letters in addition to digital distance information.

With the above and other objects in view, the present invention provides an electronic trip meter comprising a memory circuit to store predetermined sector distances, a distance presetting circuit to calculate alarm points, a counter to count actual distances travelled, a comparator to send out a signal for driving an alarm device and displaying remaining distance, and other components, where necessary, so as to supply effective distance information for the driver.

BRIEF DESCRIPTION OF THE DRAWINGS

The features and advantages of a trip meter of the present invention will become more apparent from the following description of the preferred embodiments thereof, taken in conjunction with the accompanying drawings, in which like reference numerals designate the same or similar parts throughout the figures, and wherein.

DETAILED DESCRIPTION OF THE PREFERRED EMBODIMENTS OF THE INVENTION

Figure 1:
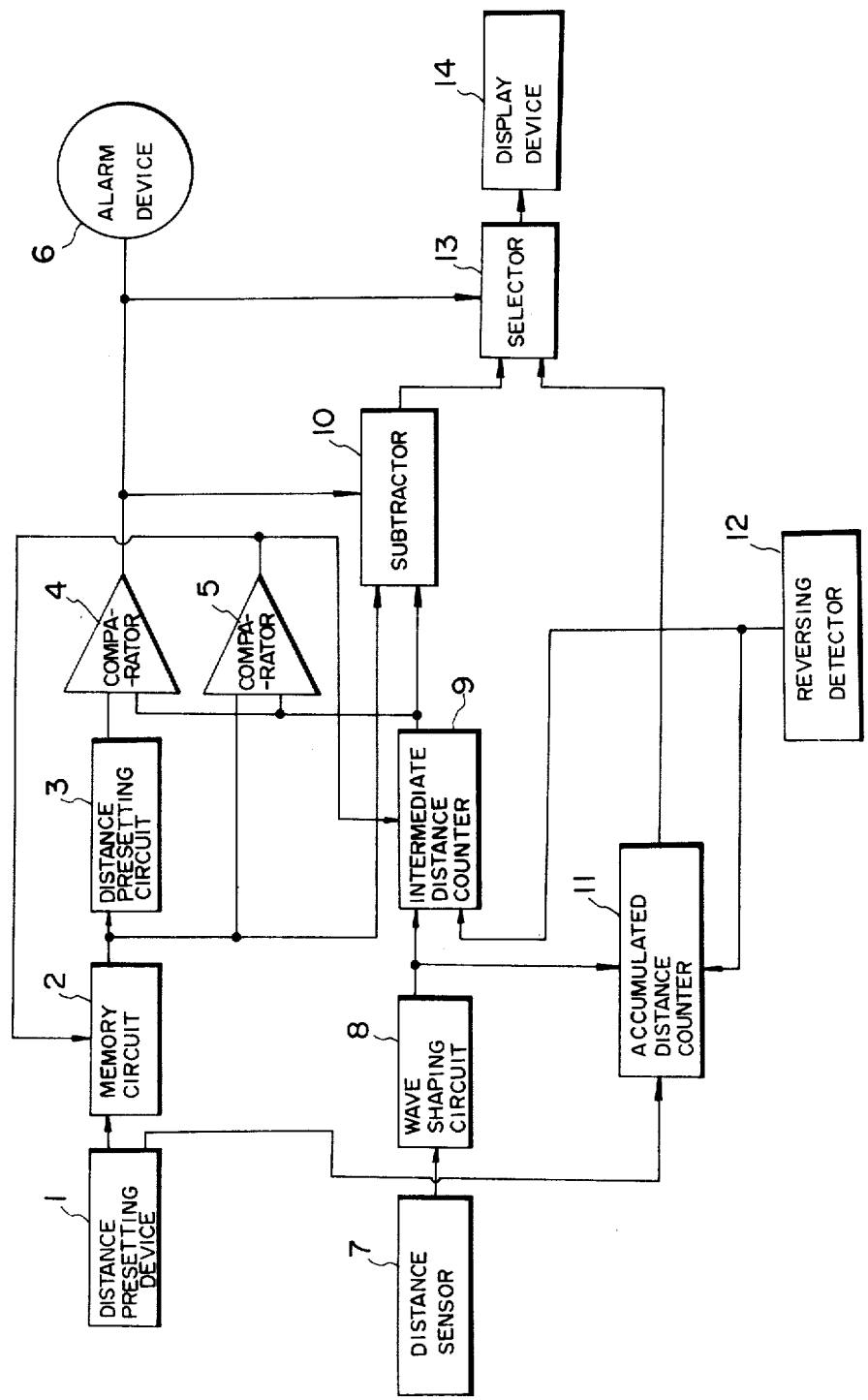
FIG. 1 is a basic block schematic diagram of a trip meter which is an embodiment of the present invention.
Figure 2:
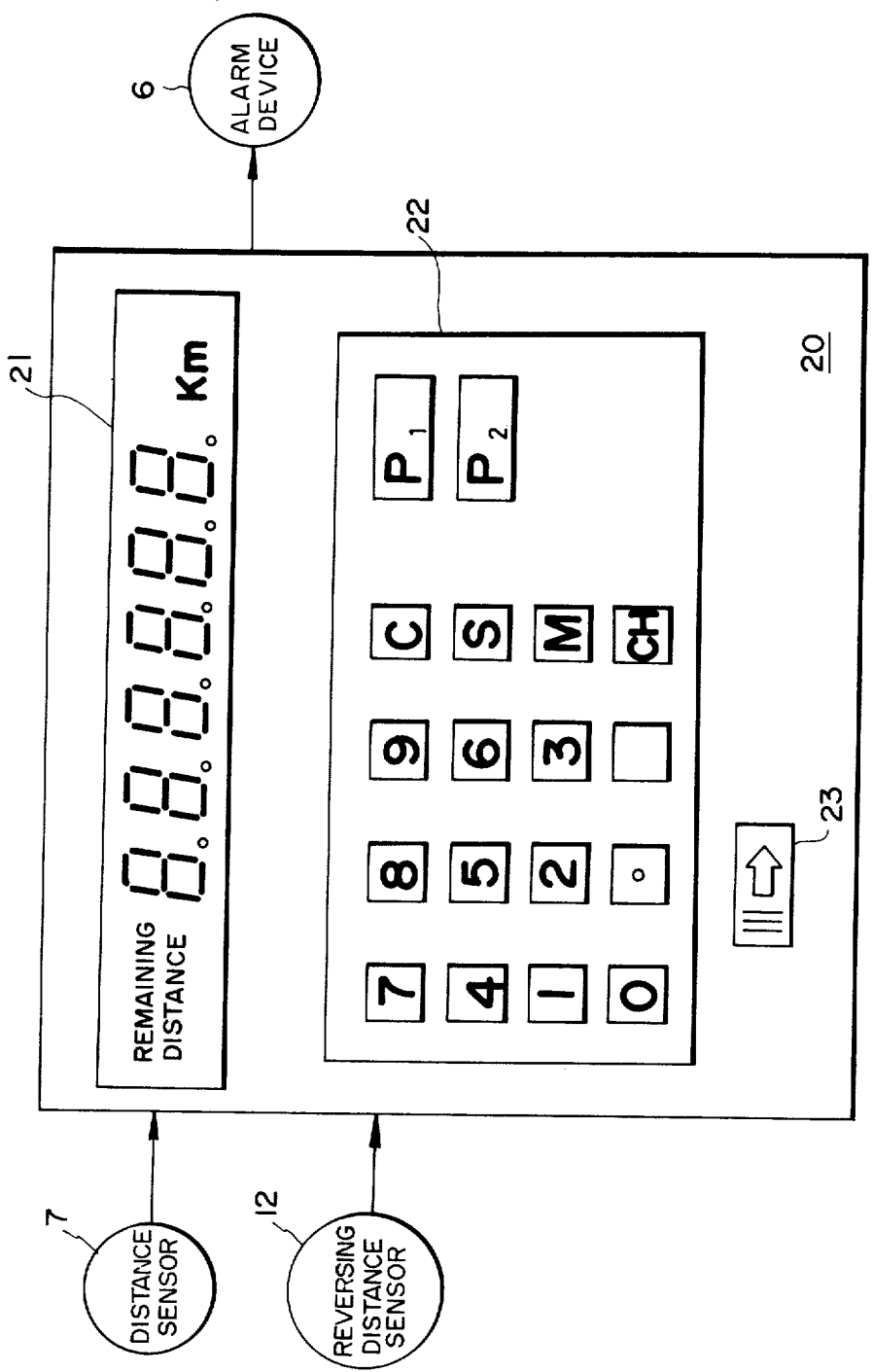
FIG. 2 shows the console panel of a body of a trip meter according to the present invention.
Figure 3:
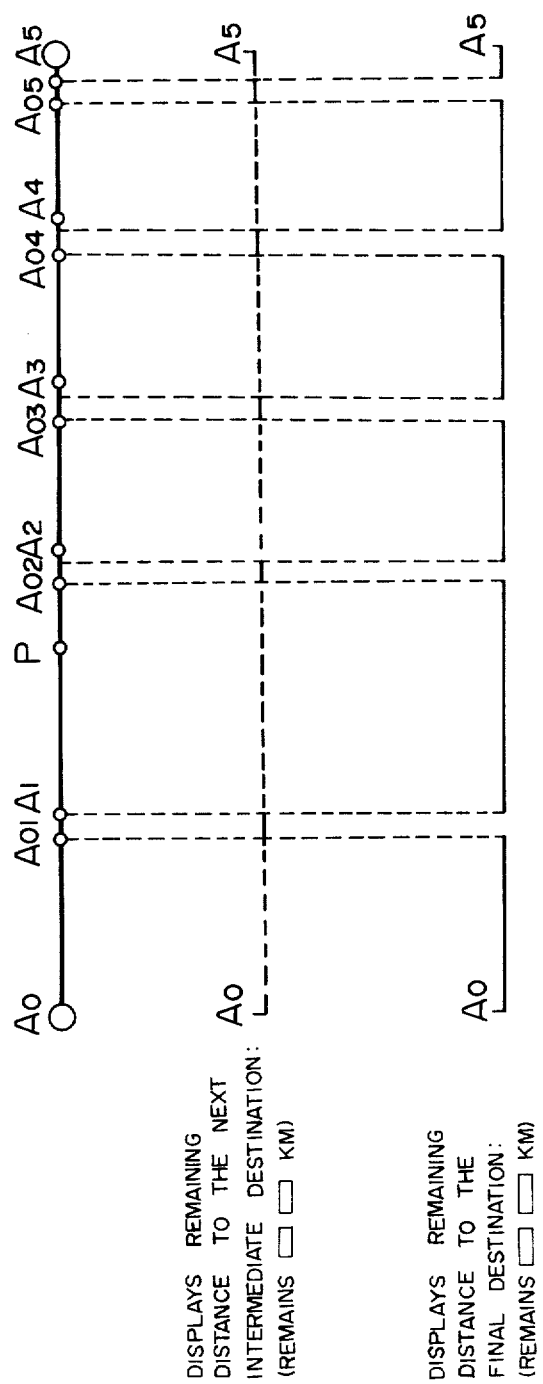
FIG. 3 is a journey diagram for an automotive vehicle provided with a trip meter of the present invention, for assistance in explaining the operations thereof.

Referring to FIGS. 1, 2 and 3, there is shown an embodiment of the present invention.

FIG. 1 is a basic block schematic diagram of a trip meter according to the present invention. In this figure, reference numeral 1 denotes a distance presetting device, 2 denotes a memory circuit, 3 denotes a distance presetting circuit, 4 and 5 denotes comparators, 6 denotes an alarm device, 7 denotes a distance sensor, 8 denotes a wave shaping circuit, 9 denotes an intermediate distance counter, 10 denotes a subtractor, 11 denotes an accumulated distance counter, 12 denotes a reversing detector, 13 denotes a selector, and 14 denotes a display device.

Sector distances between points on the intended path of the automotive vehicle are stored in the memory circuit 2 through the distance presetting device 1, which may comprise manually-operated numeric keys. It is possible to utilize the sector distances written on a road map as the distance information. The numeric values keyed in are displayable on the display 14, which is explained later.

The sector distances stored in the memory circuit 2 are sent sequentially to the distance presetting circuit 3, the comparator 5, and the subtractor 10, whenever a distance information updating command is given to the memory circuit 2 from the comparator 5 explained later. Thus the distance presetting circuit 3 contains the distance between the last destination and the next alarm point.

In the distance presetting circuit 3 is executed a calculation operation on the stored sector distance in order to define an alarm-point at the predetermined distance ahead of the next destination; for example, the distance between the start point and the alarm point just before the first intermediate destination (= the distance between the start point and the first intermediate destination ×0.9.).

On the other hand, the actual distance travelled is detected by the distance sensor 7 from the number of revolutions of a speedometer driving shaft as a pulse count, and is stored at all times in the intermediate distance counter 9 which functions as an adder-substractor through the wave shaping circuit 8 such as a Schmidt trigger circuit. The above wave-shaped actual distance pulses are normally added in the counter 9, except when the reversing detector 12 is detecting reverse motion of the automotive vehicle. The reversing detector 12 begins to operate when a switch to detect setting of the shift lever in reverse is turned on, or when the back-up lamp comes on. Also, the counter 9 is reset to zero whenever an information updating command is output from the comparator 5 in order to count distance to the next destination.

As one possibility, the wave-shaped actual distance pulses are also added to the accumulated distance counter 11 through the wave shaping circuit 8 in order to count the total distance travelled as a digital value, for the same purpose as a conventional trip meter, except when the reversing detector 12 is detecting reverse motion. On the other hand, as another possibility, when the distance from the start point to the final destination is preset to the counter 11 by the distance presetting device 1 (key $P_2$ in FIG. 2), this counter 11 is switched to a subtractor counter in order to count the remaining travel distance to the final destination. When the reversing detector 12 detects engagement of reverse gear, the counter 11 is switched from addition to substraction, or vice-versa. And the counter 11 is automatically reset to its the original state whenever the automotive vehicle begins to go forward again.

The comparator 4 compares the contents in the distance presetting circuit 3, that is, the distance between the last destination and the current alarm point just before the next destination, with the contents in the counter 9, that is, the actual distance travelled from the last destination, and sends out an output signal from the time when the actual distance travelled equals the distance to the alarm point to the time when the actual distance travelled exceeds the distance to the next destination. This output signal is fed to the alarm device 6; therefore, the alarm 6 begins to sound when the automotive vehicle arrives at the present alarm point and ceases to sound when the vehicle arrives at the present next destination.

Also, the output signal from the comparator 4 is provided to the subtractor 10 as a subtraction command. By this command, the subtractor 10 subtracts the contents in the counter 9 (the actual distance travelled from the last destination) from the contents in the memory circuit 2 (the preset next destination distance from the last destination), so that subtractor 10 holds a value representing the remaining distance to the next destination.

The output signal from the comparator 4 is also used for a switching command applied to the selector 13. By this command, when the vehicle is between the alarm point and the next destinations, the display on the display device 14 is switched from the contents in the counter 11 (actual total accumulated distance travelled) to the contents in the subtractor 10 (remaining distance to the next destination). As described later, the display device 14 indicates distance digits, a unit (Km), and a mark (remains) showing the remaining distance to the next destination.

The comparator 5 compares the contents in the memory circuit 2 (preset next destination distance from the last destination) with the contents in the intermediate counter 9 (actual distance travelled from the last destination), and gives a distance information updating command to the memory circuit 2 when these are equal, in order to update the present destination to the next destination and also to zero the counter 9.

In the above system configuration, it is necessary to dispose the distance presetting device 1 and the display device 14 in the vicinity of the driver, for example, on a console box so that the driver can readily see the preset values and the display.

FIG. 2 shows the console panel of a trip meter body of the present invention.

The trip meter body 20 is provided with a display panel 21 which is included in the display device 14, a key board 22 which is included in the distance presetting device 1, and a key lock switch 23 for disabling the key board 22. On the key board 22 are arranged numeric keys 0 to 9, a decimal point key, a clear key C used when correcting key operation errors, a start key S to start the operation, a memory key M to temporarily store the distance information, a display channel selectable key CH, a preset key $P_1$ to preset intermediate destination distances, and another preset key $P_2$ to preset the final destination distance. Also, in the body 20 are housed various electronic circuits such as the memory circuit 2, etc., and to the body 20 are connected the distance sensor 2, the reversing detector 12, and the alarm device 6 as externally connected devices.

FIG. 3 is a journey diagram which will be of assistance in explaining the operation of this system.

Referring to FIG. 1 and FIG. 3, there is shown the operation of displaying the remaining distance to the intermediate and final destinations.

In FIG. 3, point $A_0$ is the start point, points $A_1$ to $A_4$ are intermediate destinations, and point $A_5$ is a final destination, and the journey is from $A_0$, through $A_1, A_2, A_3$ and $A_4$, to $A_5$.

First, the distance between point $A_0$ and the first intermediate destination $A_1$ is stored in the memory circuit 2 by using the preset key $P_1$ on the key board 22. In the same way, the distances between $A_1$ and $A_2$, $A_2$ and $A_3$, $A_3$ and $A_4$, and $A_4$ and $A_5$ are stored in succession in the memory circuit 2. In addition, the distance between the start point $A_0$ and the final destination $A_5$ is stored in the accumulated distance counter 11 by using the other preset key $P_2$. However, it would be also possible to provide an adder for adding all the sector distances keyed in the memory circuit 2 and to automatically transfer the adder output to the counter 11 as the preset value for the total distance. After each distance is keyed in the memory circuit 2 and the counter 11, the start key S on the keyboard 22 is depressed when the vehicle is at the start point $A_0$. By this key operation, the data readout from the memory circuit 2 is started at the distance between the start point $A_0$ and the first intermediate destination $A_1$, and both the counters 9 and 11 begin to count the distance travelled.

Thus the counter 9 begins to accumulate the distance travelled (while the vehicle runs forward), and the counter 11 begins to subtract the actual distance travelled from the total journey distance, because the distance from the start $A_0$ to the final destination $A_5$ is preset to the counter 11 by the distance presetting device 1. Accordingly, the contents in the counter 11 are displayed on the display panel 21 (the remaining distance to the final destination $A_5$) until the vehicle arrives at the first alarm point $A_{01}$, just before the first intermediate destination $A_1$. Then, the comparator 4 sends out a drive signal to the alarm device 6, because the numeric value in the counter 9 (actual distance travelled) becomes equal to the numeric value in the distance presetting circuit 3, so as to inform the driver that the first intermediate destination $A_1$ is not far off. At the same time, the comparator 4 sends out a subtraction signal to the subtractor 10 so as to subtract the numeric value in the counter 9 (actual distance travelled) from the numeric value in the memory circuit 2 (distance from $A_0$ to $A_1$). The subtracted results (remaining distance) are displayed on the display device 14 through the selector 13 (because the selector 13 is also switched by the signal from the comparator 4) only when the comparator 4 is sending out the signal; that is, from the time when the numeric value in the counter 9 (actual distance travelled) becomes equal to that in the distance presetting circuit 3 (distance to the alarm point $A_{01}$) to the time when the numeric value in the counter 9 becomes equal to that in the memory circuit 2 (which signifies arrival at the preset intermediate destination $A_1$). Accordingly, the driver is warned at the alarm point $A_{01}$ of his imminent arrival at the first intermediate destination, and is kept apprised of the remaining distance to the first destination.

When the vehicle arrives at the first intermediate destination $A_1$, the comparator 4 stops sending out its signal, and the alarm device 6 stops sounding, thus telling the driver of this arrival at the first intermediate destination $A_1$. At the same time, the other comparator 5 sends out a reset signal to the intermediate counter 9 and to the memory circuit 2, because the value in the counter 9 (actual distance travelled from $A_0$) becomes equal to the value in the memory circuit 2 (preset distance from $A_0$ to $A_1$), in order to reset the present sector distance to the next one (the distance from $A_1$ to $A_2$). In the same way, when travelling from point $A_1$ to point $A_5$, the alarm begins sounding at alarm points $A_{01}$ to $A_{05}$ and stops sounding at intermediate destinations $A_1$ to $A_5$, and each remaining distance to each destination is displayed from $A_{02}$ to $A_2$, $A_{03}$ to $A_3$, $A_{04}$ to $A_4$, and $A_{05}$ to $A_5$, while, from $A_1$ to $A_{02}$, $A_2$ to $A_{03}$, $A_3$ to $A_{04}$, and $A_4$ to $A_{05}$, the remaining distance to the final destination is displayed.

As described above, the electronic trip meter of the present invention can inform the driver of alarm points and intermediate destinations by using an alarm sound, and also displays the remaining distance to the next destination, when the vehicle is near said destination, while at other times displaying a value representative of the total distance travelled.

Figure 4:
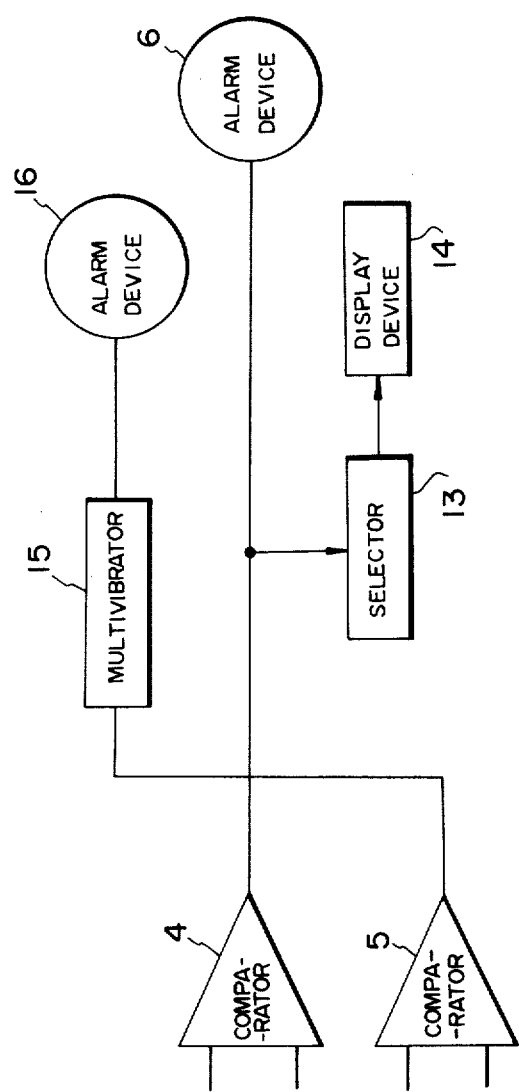
FIG. 4 is a block schematic diagram of another embodiment of the present invention.

FIG. 4 is a block schematic diagram of part of another embodiment of the present invention. The remainder of this embodiment is similar to the embodiment of FIGS. 1 to 3.

In FIG. 4, reference numeral 15 designates a monostable multivibrator and 16 designates a second alarm device.

When the comparator 5 is sending out a signal, that is, when the value in the memory circuit 2 (distance to the next destination) becomes equal to the value in the intermediate counter 9 (actual distance travelled), the multivibrator 15 comes on for a given period of time to drive the other alarm device 16 having another alarm sound different from that of the alarm device 6. Accordingly, the driver can readily and distinctly note his arrival at intermediate or final destinations. It is possible to use a subtractor counter in place of the multivibrator 15.

Two embodiments have been specifically described; however, other modified embodiments of the present invention can readily be realized as follows:

(1) The subtractor counter 11 in FIG. 1 is used to subtract the actual distance travelled from the final destination distance to display the remaining distance to the final destination; however, it is also possible to use the counter 11 so as to display accumulated distance travelled from the start point, as in the conventional mechanical trip meter, without using the distance presetting device 1 (key $P_2$ in FIG. 2).

(2) It is possible to display the remaining distance from any given point (point P in FIG. 3) to the next intermediate destination (point $A_2$ in FIG. 3) by applying a subtraction command to the subtractor 10 and a switching command to the selector 13, by using a manually operated switch, not shown.

(3) It is possible to display matters to be attended to, such as "turn left", "rest", or "supply fuel" by using appropriate marks or letters at intermediate destinations, in addition to the distance information. In this case, such information is stored in the memory circuit 2, and is displayed on the display device 14 directly from the memory circuit 2 through the selector 13, by depressing the display channel selecting key (key CH in FIG. 2) when the comparator 4 sends out an output signal.

(4) It is possible to use appropriate optical means, such as a display segments flashing device on the display device, 14 in place of the alarm device 6, which may be a buzzer. And also it is possible to use such optical means together with the alarm device.

(5) It is possible to realize the trip meter system of the present invention by utilizing a computer for executing the arithmetic operations.

As described above, an electronic trip meter of the present invention can readily and distinctly recognize points adjacent to intermediate and final destinations in addition to intermediate and final destinations, automatically inform the driver of these points without variations in performance depending on the travel speed of the vehicle, and can definitely display the remaining distance to the next destination during travel, thus supplying effective distance information for the driver.

It is further to be understood that the foregoing description concerns preferred embodiments of the present invention, which are not intended to be limitative thereof, but which are given by way of explanation. Thus it will be clear to those skilled in the art that various changes and modifications in the embodiments may be made without departing from the spirit and scope of the present invention.

What is claimed is:

1. An electronic trip meter for an automotive vehicle, which comprises:
   (a) means for storing sector distances between a start check point, an intermediate check point, and an end check point;
   (b) means for calculating positions of alarm points at predetermined distances ahead of each of the intermediate and end check points, based on the sector distances stored in the storing means;

(c) a first counter which counts distance travelled from the last check point passed, or if none have been passed, from the start point;

(d) a first comparator which outputs a signal for so long as the value in said first counter is equal to or greater than a value calculated by the calculating means for a position of an alarm point which corresponds to the point at the predetermined distance ahead of the next check point;

(e) a second comparator which outputs a signal to said storing means and to said first counter so as to reset said storing means to present information relevant to the next check point, and to zero said first counter, when the value in said first counter coincides with the value presented by said storing means;

(f) a first alarm device;

(g) means for activating said first alarm device whenever the distance travelled by the vehicle is such as to place the vehicle between an alarm point and an associated one of said intermediate and end check points, comprising means for connecting the output signal from said first comparator to said first alarm device thereby activating said first alarm device for so long as said first comparator provides said output signal thereof;

(h) a subtractor for subtracting the value in said first counter from the value presented by said sector distance storing means whenever said first comparator is providing said output signal, and (i) a display device which displays the result produced by the subtractor.

2. An electronic trip meter for an automotive vehicle as defined in claim 1, which further comprises:

(a) a second counter for counting distance remaining to the end check point by subtracting the actual distance travelled from a previously preset end check point distance; and (b) a selector connected for receiving, and being switched by, the output signal from said first comparator, for switching the display on said display device from the results in said subtractor to the results in said second counter, when no output signal is provided from said first comparator to said selector.

3. An electronic trip meter for an automotive vehicle as defined in claim 1, which further comprises:

(a) a second counter which accumulates the total travel distance from the start check point; and (b) a selector connected for receiving, and being switched by, the output signal from said first comparator for switching the display on said display device from the results in said subtractor to the results in said second counter, when no output signal is provided from said first comparator to said selector.

4. An electronic trip meter for an automotive vehicle as defined in claim 2 or 3, which further comprises: a manually operable switch for providing a subtraction command to said subtractor and a switching command to said selector in order to display the remaining distance to the next check point.

5. An electronic trip meter for an automotive vehicle as defined in claim 2 or 3, which further comprises: a display channel selecting key for selecting an appropriate symbol from among a plurality of symbols, representing matters to be attended to, stored in said storing means in order to display the symbol on said display device through said selector, when said first comparator sends an output signal to said selector.

6. An electronic trip meter for an automotive vehicle as defined in claim 1, which further comprises:

(a) a second alarm device which provides an alarm different from the alarm provided by said first alarm device; and (b) means for providing an output signal to said second alarm device for a predetermined period of time when said second comparator sends out an output signal.

7. An electronic trip meter for an automotive vehicle as defined in claim 2 or 3, which further comprises: a reversing detector for detecting engagement of reverse gear in order to subtract reverse distance travelled from actual distance travelled in said first and second counters.

8. An electronic trip meter for an automotive vehicle, which comprises:

(a) a distance presetting device for presetting a number of sector distances between a start check point and intermediate check points and a total distance between the start check point and a final check point and generating signals corresponding thereto;

(b) a memory circuit connected to said distance presetting device for storing the signals indicative of each of the sector distances generated from said distance presetting device;

(c) a distance presetting circuit connected to said memory circuit for defining a distance from each of said start and intermediate check points to an alarm to an alarm point, within each of said sector distances, at a predetermined distance ahead of each of the intermediate check points and of the final check point by executing a multiplication operation on each of the sector distances stored in said memory circuit and on a predetermined multiplier stored therein;

(d) a distance sensor for detecting the actual distance travelled and generating signals corresponding thereto;

(e) an intermediate distance counter connected to said distance sensor for counting up the distance travelled while the vehicle runs forward and outputting signals corresponding thereto;

(f) a first comparator having two input terminals, one input terminal of which is connected to said distance presetting circuit and the other input terminal of which is connected to said intermediate distance counter, for comparing the signal output from said distance presetting circuit indicative of the distance to an alarm point with the signal output from said intermediate distance counter indicative of the actual distance travelled and for outputting an alarm signal when the distance travelled agrees with the distance to the alarm point;

(g) a second comparator having two input terminals, one input terminal of which is connected to said memory circuit, the other input terminal of which is connected to said intermediate distance counter, and an output terminal connected to reset terminals of said memory circuit and said intermediate distance counter, for comparing the signal output from said memory circuit indicative of the sector distance with the signal output from said intermediate distance counter indicative of the actual distance travelled and for outputting a reset signal to said memory circuit and to said intermediate distance counter when the sector distance agrees with the actual distance travelled;

(h) a first alarm device connected to the output terminal of said first comparator for producing an alarm in response to the signal output from said first comparator, and (i) activating means for causing said first alarm device to begin to operate when the automotive vehicle arrives at each alarm point and to cease to operate when the automotive vehicle arrives at each intermediate check point and at the final check point.

9. An electronic trip member for an automotive vehicle as set forth in claim 8, wherein said distance presetting device comprises;

(a) ten numeric keys representing numerals from 0 to 9 for input of distances thereto;

(b) a decimal point key for providing a proper scale to the input distances;

(c) a first preset key to preset sector distances between the start check point and intermediate check points;

(d) a second preset key to preset a total distance between the start check point and the final check point;

(e) a clear key for correcting errors in operation of various keys of the presetting device.

10. An electronic trip meter for an automotive vehicle as set forth in claim 8, wherein the predetermined multiplier stored in said distance presetting circuit is approximately 0.9.

11. An electronic trip meter for an automotive vehicle as set forth in claim 8, which further comprises;

(a) a monostable multivibrator connected to the output terminal of said second comparator for outputting a signal for a predetermined period of time when said second comparator triggers said monostable multivibrator; and (b) a second alarm device connected to said multivibrator for producing an alarm different from the alarm provided by said first alarm device;

(c) said first alarm device being operative from a point in time when the vehicle reaches each alarm point to a time when the vehicle reaches each intermediate check point or the final check point, and said second alarm device being operative for a predetermined period of time when the vehicle arrives at each intermediate check point and at the final check point.

12. An electronic trip meter for an automotive vehicle as set forth in claim 8, which further comprises a reversing detector connected to said intermediate distance counter for detecting reverse distance travelled and outputting signals indicative of subtraction of reverse distance travelled from actual distance travelled.

13. An electronic trip meter for an automotive vehicle as set forth in claim 8 further comprising a subtractor for subtracting the distance in said intermediate distance counter from the distance represented by said memory circuit, said memory circuit being connected for providing sector distances sequentially to said distance presetting circuit, to said second comparator, and to said subtractor, whenever said second comparator provides a reset signal thereto.

14. An electronic trip meter for an automotive vehicle as set forth in claim 8 further comprising a display means for displaying a remaining distance to the intermediate and final check point and distance travelled from the start check point.

15. An electronic trip meter for an automotive vehicle as set forth in claim 14 further comprising selecting means for alternating said display means between said displays of remaining distance and of distance travelled, said selecting means connected to said first comparator output signal and causing said display means to display the remaining distance responsive to said output signal of said first comparator, said display means thereby displaying remaining distance to a next check point when the distance travelled exceeds the distance to the alarm point ahead of that check point.

* * * * *